US009665508B2

(12) United States Patent
Snyder, II et al.

(10) Patent No.: US 9,665,508 B2
(45) Date of Patent: May 30, 2017

(54) METHOD AND AN APPARATUS FOR CONVERTING INTERRUPTS INTO SCHEDULED EVENTS

(71) Applicant: Cavium, Inc., San Jose, CA (US)

(72) Inventors: Wilson Parkhurst Snyder, II, Holliston, MA (US); Lei Tian, Boxborough, MA (US)

(73) Assignee: Cavium, Inc., San Jose, CA (US)

( * ) Notice: Subject to any disclaimer, the term of this patent is extended or adjusted under 35 U.S.C. 154(b) by 373 days.

(21) Appl. No.: 14/140,585

(22) Filed: Dec. 26, 2013

(65) Prior Publication Data

US 2015/0186306 A1 Jul. 2, 2015

(51) Int. Cl.
*G06F 13/20* (2006.01)
*G06F 13/24* (2006.01)

(52) U.S. Cl.
CPC .................................... *G06F 13/24* (2013.01)

(58) Field of Classification Search
None
See application file for complete search history.

(56) References Cited

U.S. PATENT DOCUMENTS

| | | | | |
|---|---|---|---|---|
| 7,328,294 B2 * | 2/2008 | Kim | ...................... | G06F 9/5011 710/260 |
| 7,702,835 B2 * | 4/2010 | Riethmuller | .......... | G06F 9/4812 710/260 |
| 2003/0034506 A1 * | 2/2003 | Pandya | ............... | H01L 21/8258 257/201 |
| 2003/0204655 A1 * | 10/2003 | Schmisseur | ............. | G06F 13/26 710/260 |
| 2004/0015628 A1 * | 1/2004 | Glasco | .................... | G06F 13/24 710/260 |
| 2010/0077394 A1 * | 3/2010 | Wang | .................. | G06F 9/45533 718/1 |
| 2011/0016247 A1 * | 1/2011 | Ohmasa | .................. | G06F 13/26 710/264 |

* cited by examiner

*Primary Examiner* — Elias Mamo
(74) *Attorney, Agent, or Firm* — pkalousek.ip

(57) ABSTRACT

A method and an apparatus embodying the method for converting interrupts into scheduled events, comprising receiving an interrupt at an interrupt controller; determining a vector number for the interrupt; determining properties of an interrupt work in accordance with the vector number; and scheduling the interrupt work in accordance with the properties of the interrupt work, is disclosed.

12 Claims, 2 Drawing Sheets

METHOD AND AN APPARATUS FOR CONVERTING INTERRUPTS INTO SCHEDULED EVENTS

BACKGROUND

1. Field

The present disclosure relates to network processors. More particularly, this invention is directed toward processing of an interrupt at a processor.

2. Description of Related Technology

During a processor's operation, an interrupt may be received at the processor. An interrupt is a signal originated by a hardware or a software entity, which alert the processor to an event that needs the processor's immediate attention. In response, the processor suspends current operation, saves the state of the operation, and executes an interrupt handler program. After the interrupt handler finishes attending to the interrupt, the processor resumes execution of the interrupted operation.

In network processors, where a processor core operation may be in the middle of an important sequence of operations on a packet, perhaps even in a critical part of such a sequence of operations, an interrupt may potentially stall many other processor cores potentially involved in or being affected by the sequence of operations, until the interrupt is handled. Consequently, methods for mitigating such a problem were developed.

According to one such method, during a critical sequence of operations, interrupts may be disabled or only the interrupts classified as the highest priority will be accepted. Such a method is not recommended when the critical sequences of operations may take significant time, due to the risk that due to the time for finishing the critical sequences of operations it cannot be guaranteed that the processor core will handle the interrupt in a timely manner.

Accordingly, there is a need in the art for an interrupt handling, providing a solution to the above identified problems, as well as additional advantages.

SUMMARY

In an aspect of the disclosure, a method and an apparatus embodying the method for converting interrupts into scheduled events according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an" and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

Figure 1:
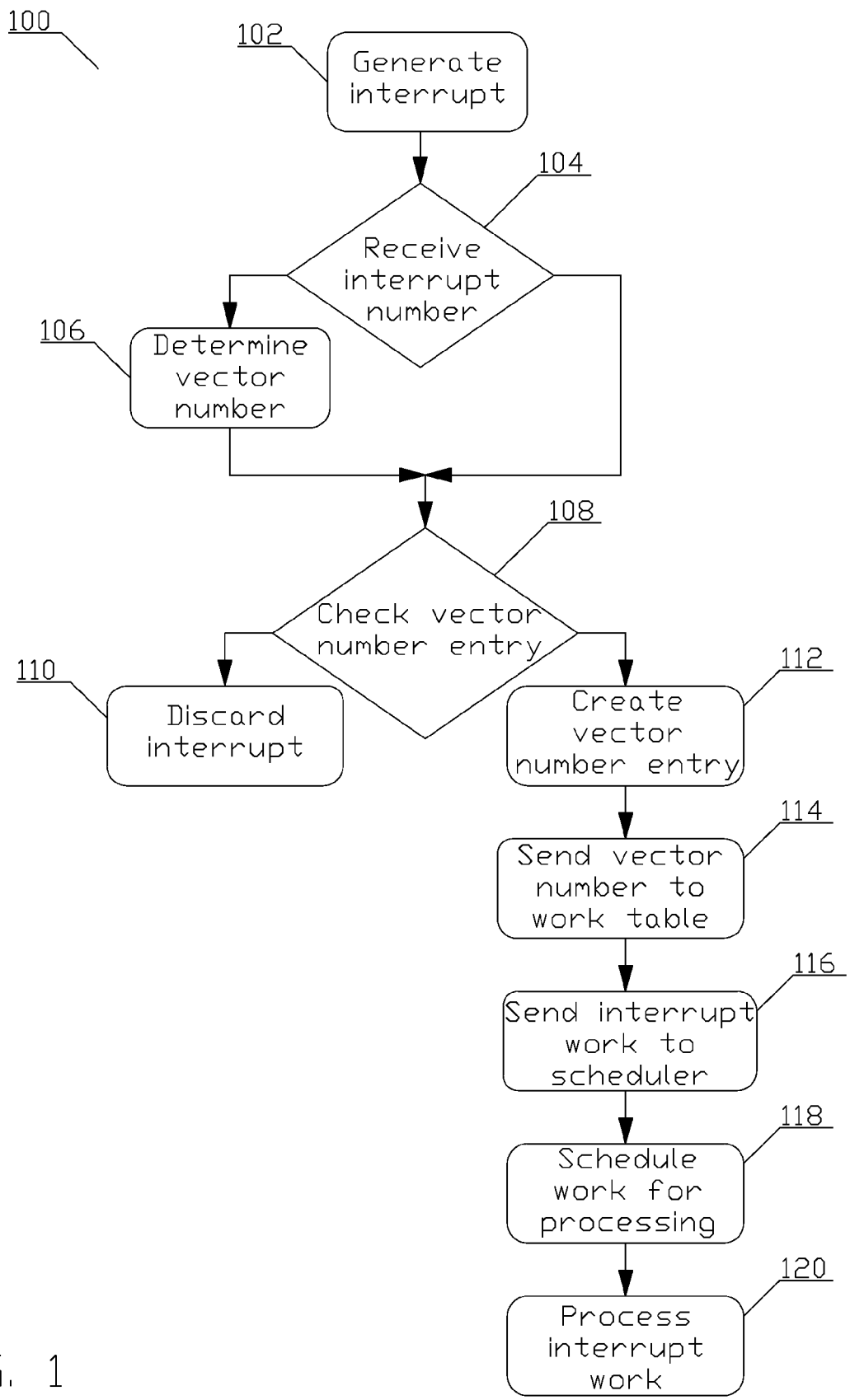
FIG. 1 depicts a flow chart enabling a process for converting interrupts into scheduled events in accordance with an aspect of this disclosure.
Figure 2:
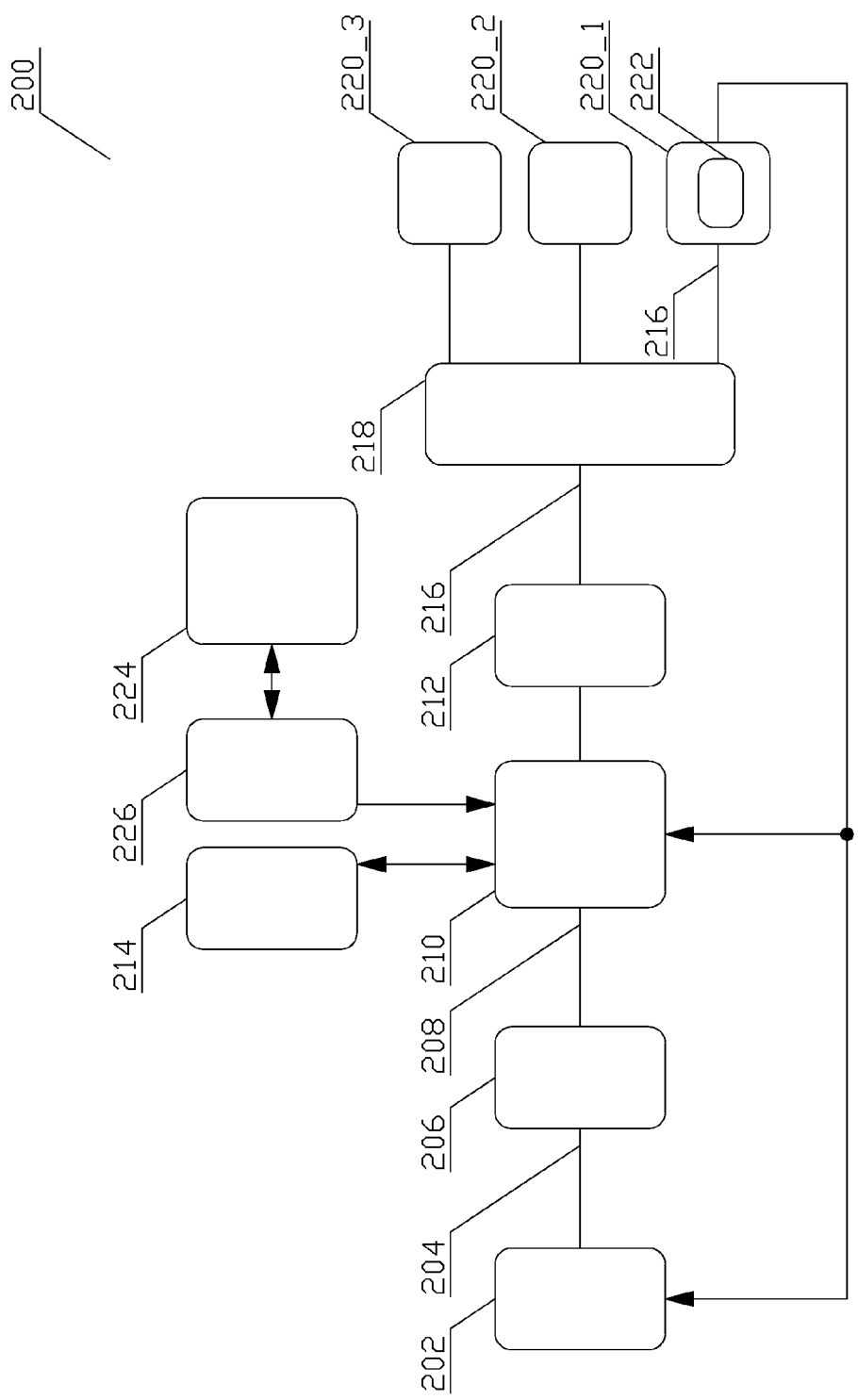
FIG. 2 depicts a block diagram of principal elements enabling the process for converting interrupts into scheduled events in accordance with an aspect of this disclosure.

FIG. 1 depicts a flow chart 100 enabling a process for converting interrupts into scheduled events. To clarify the relationship between certain elements of the block diagram 200 depicted in FIG. 2 referenced in FIG. 1 and associated text, references to elements of the block diagram 200, depicting a conceptual structure and information flow among the elements of the structure enabling the process, are in parenthesis. The elements comprise hardware or software entities implementing the blocks and/or the blocks' functionality In block 102, a hardware or a software entity (202) generating an interrupt (204) provides the interrupt to an interrupt controller (206). In an aspect, the interrupt (204) comprises an interrupt number which is used directly as a vector number. In an aspect, the vector number may comprise an index to a structure, which contains memory address of an interrupt handler. In another aspect, the vector number is an opaque handle. The process continues in block 104

In block 104 the interrupt controller (206) determines if the provided interrupt (204) comprises an interrupt number, and if the determination is negative, the process continues in block 106; otherwise the process continues in block 108.

In block 106, the interrupt controller (206) prioritizes the provided interrupt (204) and determines a vector number (208), using a pre-determined, processor specific processing, e.g., by having a fixed, hardcoded, vector number for each interrupt generating entity, or other processing known to a person of ordinary skills in the art. The processing continues in block 108.

In block 108, instead of delivering the vector number (208) to a processor core, the interrupt controller (206) provides the vector number (208) to a structure (210), which relates the vector numbers and status corresponding to each of the vector number. Such a status may comprise waiting, if the vector number entry in the structure (210) has not yet been provided to a scheduler engine (218), and the status may comprise a pending, if the vector number entry structure (210) has been provided to a scheduler engine (218). In one aspect, the structure (210) comprises a vector table. The vector number (208) is compared to the vector numbers entries in the vector table (210). If the vector number (208) already has an entry in the vector table (210), processing continues in block 110; otherwise the processing continues in block 112.

In block 110, the vector number (208) is ignored because an event caused by an interrupt with the same vector number is already pending; consequently, a duplicate event is not needed, and is, therefore, discarded to improve performance. Further processing for the interrupt with this vector number is stopped because the original interrupt with this vector number, a status of which is pending, is already being processed.

In block 112, a new entry with the vector number (208) is created and the status is set accordingly. In an aspect, the status is set to waiting when no processor core is available to process the interrupt event, and to pending when a processor core is available to process the interrupt event. In another aspect, the status is always set to waiting. The processing continues in block 114.

In block 114, according to an aspect of the disclosure, the vector number (208) a status of which has been set to waiting is sent to a per-vector work table (212) together with the status. However, the interrupts may not be absorbed immediately if the scheduling engine (218) is busy due to containing finite internal resources insufficient to absorb every interrupt event that may be generated.

Consequently, in another aspect, the table (210) is being polled by a scanner (214) for the status of the vector number entries in accordance to a schedule. The schedule may be periodic, or the poll may be triggered by an event, e.g., the resources in the scheduling engine (218) becoming available. The result of the poll is evaluated and all interrupts, status of which has been set to waiting are sent to a per-vector work structure (212) and the status of all the sent interrupts is set to pending.

The structure (212) may comprise a table, associating each vector number (208) with properties of the interrupt work (216) that needs to be carried out. Work is a general concept of something to be processed. The work properties are specific to an implementation of a scheduler engine (218). By means of an example, such work properties may comprise a work queue entry, comprising a pointer to the work to be processed. By means of an example, in the case of an interrupt work, the pointer indicates a data structure used to process the interrupt. Another property may comprise a work Quality of Service (QoS), i.e., indicator(s) which portion of the scheduler engine (218) will handle the work, processor cores that may handle the work, priority related to that work, and other QoS related indicator(s) known to person of ordinary skills in the art. Yet another property may indicate whether the work can be carried out in parallel manner, or whether the work must be carried out in serial manner. A person of ordinary skills in the art will understand that other and/or additional work properties are contemplated.

In one aspect, the table (212) is implemented on a chip incorporating other hardware entities, e.g., the interrupt controller (206), the scanner (214), the scheduler (218) and additional hardware entities. Since each of the hardware entities consumes real estate on the chip, and, furthermore, an on-chip memory is expensive due to requirement on area, the size of the table (212) is limited. As such, the size of the table (212) may be insufficient to absorb every interrupt event that may be generated.

Consequently, in another aspect, the table (212) is not implemented on the chip, but is located in a main memory (224) outside of the chip. Consequently, the main memory, being typically implemented in external Dynamic Random-Access Memory DRAM components, have a lower cost per unit bit than the on-chip Random-Access Memory (RAM). To minimize overhead associated with access of the main memory, work properties for a single interrupt are held by the table (212) as a single row of a pre-determined size (row_size). The row size is determined in accordance with the size of the properties of the interrupt work expressed as, e.g., number of bytes required to store the properties required by the specific implementation of the scheduler engine (218). Furthermore, only a single address is needed to access any record in the table (212). A base address (base_address), pointing to the location in the main memory where the beginning of the table (212) is located, is provided to a block (226) interfacing the table (212) with the main memory (226). To access interrupt work properties for a vector number (208), the block (226) calculates the interrupt work properties' address (work_address) according the equation:

$$\text{work\_address} = \text{base\_address} + \text{vector number} * \text{row\_size} \qquad \text{Eq. (1)}$$

During configuration, the interrupt work properties for each vector number are written to the calculated interrupt work properties' address. To retrieve the interrupt work properties for a specific vector number (208) from the table (212), the interrupt work address is calculated by the block (226) from the base address, size of the properties of the interrupt work, and the vector number (208), using Eq. (1) and the interrupt work address is provided to the main memory (224), which returns the interrupt work properties found at the provided interrupt work address.

The processing continues in block 116.

In block 116, the table (212) sends a request to the scheduler engine (218) to accept any interrupt work (216) a status of which is pending. In response, the scheduler engine (218) receives and schedules the interrupt work (216) from the table (212) in the same manner as any other work requested from the scheduler engine (218) may be added. In other words, the interrupt work (216) requested by the table (212) is treated by the scheduler engine (218) as any other requested work e.g., a work representing a newly received packet, completion of a packet processing, a coprocessor completing a task, a software requested work item, or any other work requests known to a person skilled in the art. The processing continues in block 118.

In block 118, the scheduler engine (218) queues any received work and determines scheduling of all the received work, including the interrupt work (216), for the processor cores (220). Although only three processor cores (220) are shown, a person of ordinary skills in the art will recognize that the number of processor cores is an implementation choice and may, therefore, be different. The scheduling is determined, in accordance with the properties of the work as implemented by the scheduling engine's (218) scheduling algorithm.

Upon receiving from one or more of the processor cores (220), e.g., the processor core (220_1), request for work, the scheduler engine (218) assigns the work to the requesting processor core (220_1), e.g., by providing a pointer to the work queue entry of the scheduled work, e.g., the interrupt work (216), to the requesting processor core (220_1). Thus any of the cores (220) are not encountering any processing related to an interrupt work until the interrupt work is presented as a regularly scheduled work. The processing continues in block 120.

In block 120, a software entity (222) executing on the processor core (220_1) retrieves the interrupt work (216) as part of a work handling schedule. The software entity (222) recognizes the work as an interrupt work (216) from the a pointer to the work queue entry. Since the interrupt work (216) is now accepted, the software entity (222) invokes an interrupt handler to resolve the interrupt condition, removes the entry for the vector number (208) from the structure (210), and clears the hardware or the software entity (202) that generated the interrupt (204). The processing continues in block 102.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation. By means of an example, although structures 210 and 212 were described as separate, the structures may be implemented as a single structure. By means of another example, although handling of the interrupt work was disclosed in terms of a single processor core, a scheduled interrupt work may be handled by more than one processor cores.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for converting interrupts into scheduled events, comprising:
   receiving an interrupt at an interrupt controller;
   determining a vector number for the interrupt;
   determining a status associated with the vector number;
   reading properties of an interrupt work from a table in accordance with the vector number when the determined status is waiting; and
   scheduling by a scheduler engine the interrupt work in accordance with the properties of the interrupt work like any other requested work.

2. The method as claimed in claim 1, further comprising:
   delivering the interrupt work to at least one processor core assigned to handle the interrupt work according to the scheduling.

3. The method as claimed in claim 1, wherein the determining a vector number for the interrupt comprises:
   determining whether the interrupt comprises an interrupt number;
   using the interrupt number as the vector number when the determining is positive; and
   determining the vector number in accordance with a pre-determined processing when the determining is negative.

4. The method as claimed in claim 1, further comprising:
   discarding the interrupt when the status associated with the vector number is pending.

5. The method as claimed in claim 1, wherein the reading the properties of the interrupt work from a table in accordance with the vector number when the status associated with the vector number is waiting comprises:
   reading the properties of the interrupt work from a table located in a main memory.

6. The method as claimed in claim 5, wherein reading the properties of the interrupt work from a table located in a main memory comprises:
   calculating an address in accordance with a base address, a size of the properties of the interrupt work, and the vector number; and
   reading the properties of the interrupt work from the table at the calculated address.

7. An apparatus for converting interrupts into scheduled events, comprising:
   a hardware interrupt controller configured to receive an interrupt, to determine a vector number for the interrupt, to determine a status associated with the vector number;
   a structure, communicatively coupled with the interrupt controller, configured to read properties of an interrupt work from a table in accordance with the vector number when the determined status is waiting; and
   a scheduler engine, communicatively coupled to the structure, configured to schedule the interrupt work in accordance with the properties of the work like any other requested work.

8. The apparatus as claimed in claim 7, further comprising:
   at least one processor core, communicatively coupled to the scheduler, assigned to handle the interrupt work according to the schedule.

9. The apparatus as claimed in claim 7, wherein the hardware interrupt controller determines a vector number for the interrupt by being configured to:
   determine whether the interrupt comprises an interrupt number;
   use the interrupt number as the vector number when the determining is positive; and
   determine the vector number in accordance with a pre-determined processing when the determining is negative.

10. The apparatus as claimed in claim 7, wherein the hardware interrupt controller is further configured to: discard the interrupt when the status associated with the vector number is pending.

11. The apparatus as claimed in claim 7, further comprising:
- an interface, communicatively coupled with the structure and a main memory; and
- wherein the table is located in the main memory.

12. The apparatus as claimed in claim 11, wherein the interface is configured to:
- calculate an address in accordance with a base address, a size of the properties of the interrupt work, and the vector number; and
- read the properties of the interrupt work from the table at the calculated address.

* * * * *